United States Patent
Kamiya et al.

(10) Patent No.: US 8,459,014 B2
(45) Date of Patent: Jun. 11, 2013

(54) MOUNTING STRUCTURE FOR NOX REDUCTION DEVICE FOR CONSTRUCTION MACHINE

(75) Inventors: Shohei Kamiya, Tsuchiura (JP); Masanori Ezawa, Tsuchiura (JP); Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 307 days.

(21) Appl. No.: 12/811,452

(22) PCT Filed: Jan. 7, 2009

(86) PCT No.: PCT/JP2009/050081
§ 371 (c)(1),
(2), (4) Date: Jul. 1, 2010

(87) PCT Pub. No.: WO2009/088018
PCT Pub. Date: Jul. 16, 2009

(65) Prior Publication Data
US 2010/0293928 A1    Nov. 25, 2010

(30) Foreign Application Priority Data

Jan. 8, 2008   (JP) .................................. 2008-001347

(51) Int. Cl.
*F01N 3/24*   (2006.01)
(52) U.S. Cl.
USPC ............................................. 60/295; 60/301
(58) Field of Classification Search
USPC ................................................. 60/295, 301
See application file for complete search history.

(56) References Cited

U.S. PATENT DOCUMENTS 6,481,748 B1 * 11/2002 Okuda et al. .................. 280/755
2002/0170616 A1   11/2002 Channing
(Continued)

FOREIGN PATENT DOCUMENTS

| EP | 1 306 490 A1 | 5/2003 |
| EP | 1 327 722 A1 | 7/2003 |

(Continued)

OTHER PUBLICATIONS

International Search Report dated Apr. 14, 2009 with English translation (four (4) pages).

(Continued)

*Primary Examiner* — Thomas Denion
*Assistant Examiner* — Jorge Leon, Jr.
(74) *Attorney, Agent, or Firm* — Crowell & Moring LLP (57) ABSTRACT

A mounting structure for an NOx reduction system for a construction machine is provided for relaxing restrictions on a space for the arrangement of the NOx reduction system. The mounting structure includes a urea-water SCR catalyst for reducing and purifying nitrogen oxides emitted from an engine, a urea water spray device for spraying urea water into an exhaust passage of the engine, a urea water feeder for feeding the urea water to the urea water spray device, a first urea-water tank and second urea-water tank for storing the urea water to be guided to the urea water feeder, and a controller for controlling drive of the urea water spray device and urea water feeder. A counterweight is provided with a cavity formed therein, the urea water feeder, first urea-water tank, second urea-water tank and controller are integrally arranged as an assembly arranged in the cavity of the counterweight.

4 Claims, 7 Drawing Sheets

U.S. PATENT DOCUMENTS

| | | | |
|---|---|---|---|
| 2008/0143345 A1* | 6/2008 | Boudaoud et al. | 324/652 |
| 2010/0025136 A1* | 2/2010 | Matsushita et al. | 180/68.3 |
| 2010/0038162 A1* | 2/2010 | Kamiya et al. | 180/69.6 |

FOREIGN PATENT DOCUMENTS

| | | |
|---|---|---|
| JP | 61-119822 U | 7/1986 |
| JP | 3-281912 A | 12/1991 |
| JP | 2002-13161 A | 1/2002 |
| JP | 2003-020936 A | 1/2003 |
| JP | 2003-41627 A | 2/2003 |
| JP | 2007-331602 A | 12/2007 |
| WO | WO 2009001587 A1 * | 12/2008 |

OTHER PUBLICATIONS

Bogdanoff, "Low-emission locomotive projects", Air Quality Management District, Jul. 13, 2006, XP002685662, Second CARB Public Meeting, pp. 1-13.

Supplementary European Search Report dated Oct. 31, 2012 (seven (7) pages).

* cited by examiner

MOUNTING STRUCTURE FOR NOX REDUCTION DEVICE FOR CONSTRUCTION MACHINE

TECHNICAL FIELD

This invention relates to a mounting structure for an NOx reduction system, which is to be arranged on a construction machine such as a hydraulic excavator and includes, as components, a reducing agent spray device, a reducing agent feeder and a reducing agent storage tank.

BACKGROUND ART

As a conventional technology of this sort, there is one disclosed in Patent Document 1. Disclosed in this Patent Document 1 is a construction that, to avoid freezing of a liquid reducing agent for reducing nitrogen oxides emitted from an engine, a liquid reducing agent tank is arranged in a vehicle or machine, for example, in a hydraulic excavator at a position where it can be kept warm. Described specifically, a construction is disclosed, in which the liquid reducing agent tank, in other words, the reducing agent storage tank is arranged at a position where it can be kept warm, such as in close proximity to a hydraulic pump or in close proximity to a valve, i.e., a hydraulic pressure control valve unit in an engine compartment, in an operator's cab, or in close proximity to a a hydraulic oil tank.

Patent Document 1: JP-A-2003-20936

DISCLOSURE OF THE INVENTION

Problem to be Solved by the Invention

With the above-mentioned conventional technology, an attempt to arrange a reducing agent storage tank, for example, in close proximity to a hydraulic pump in an engine compartment tends to lead to a difficulty in securing a space for the arrangement of the reducing agent storage tank when an arrangement space in the engine room is relatively small, because equipment such as a fuel filter, oil filter and the like have to be arranged at the same time around the hydraulic pump. Further, an NOx reduction system generally includes, in addition to the above-mentioned reducing agent storage tank, a reducing agent spray device, a reducing agent feeder, a controller for controlling drive of these reducing agent spray device and reducing agent feeder, and the like, as components. The above-mentioned conventional technology is, therefore, accompanied by a problem in that it tends to receive restrictions on the space for the arrangement of the NOx reduction system including the arrangement of these reducing agent spray device, reducing agent feeder, controller and the like.

With the foregoing current circumstances in view, the present invention has as an object thereof the provision of a mounting structure for an NOx reduction system for a construction machine, which can relax the restrictions on the space for the arrangement of the NOx reduction system.

Means for Solving the Problem

To achieve this object, a mounting structure according to the present invention for an NOx reduction system for a construction machine is characterized in that, in the mounting structure for the NOx reduction system which is to be arranged on the construction machine having an engine, a hydraulic pump drivable by the engine, a hydraulic actuator drivable by pressure oil delivered from the hydraulic pump, a hydraulic pressure control valve unit for controlling a flow of pressure oil to be fed from the hydraulic pump to the hydraulic actuator, a body frame holding the engine, hydraulic pump and hydraulic pressure control valve unit in place thereon, and a counterweight fixedly secured on the body frame at a rear position of a body to maintain stability of the body, which includes a reduction catalyst to be arranged in an exhaust passage of the engine to reduce and purify nitrogen oxides emitted from the engine, a reducing agent spray device for spraying a reducing agent into the exhaust passage of the engine, a reducing agent feeder for feeding the reducing agent to the reducing agent spray device, a reducing agent storage tank having a fill opening to fill the reducing agent and to store therein the reducing agent to be guided to the reducing agent feeder, and a controller for controlling drive of the reducing agent spray device and reducing agent feeder, and which is to be mounted on the body frame, the counterweight is provided with a cavity formed therein, the reducing agent feeder, reducing agent storage tank and controller are integrally arranged as an assembly, and the assembly is to be arranged in the cavity of the counterweight.

According to the present invention constructed as described above, the reducing agent feeder, reducing agent storage tank and controller among the components of the NOx reduction system are integrally arranged as the assembly in the cavity of the counterweight. It is, therefore, necessary to arrange only the remaining components of the NOx reduction system, that is, the reduction catalyst and reducing agent spray device at positions outside the counterweight, thereby making it possible to relax the restrictions on the space for the arrangement of the NOx reduction system.

The mounting work of the reducing agent feeder, reducing agent storage tank and controller can be facilitated, as the reducing agent feeder, reducing agent storage tank and controller are integrated as the assembly and are built compact.

Further, the reducing agent feeder, reducing agent storage tank and controller included in the assembly can be protected from external impacts, as the reducing agent feeder, reducing agent storage tank and controller are protected by the counterweight formed of a rigid body.

In addition, the fill opening of the reducing agent storage tank can be positioned in the cavity of the counterweight. Upon filling the reducing agent into the reducing agent storage tank, the effect of wind produced by a fan arranged in an engine compartment can, therefore, be reduced, thereby making it possible to suppress the reducing agent from scattering around.

Moreover, the arrangement of the NOx reduction system on each of construction machines of different models such as large and small construction machines can be facilitated. Described specifically, when arranging the NOx reduction system, for example, on a construction machine of a small model, it is only necessary to provide a single reducing agent storage tank of a unit capacity as the reducing agent storage tank included in the assembly. When arranging it on a construction machine of a large model, on the other hand, it is only necessary to provide a plurality of such reducing agent storage tanks of a unit capacity as mentioned above.

The mounting structure according to the present invention for the NOx reduction device for the construction machine may also be characterized in that in the above-described invention, the construction machine is provided adjacent the counterweight with an engine compartment in which the engine and hydraulic pump are arranged, and the reduction catalyst and reduction catalyst spray device are arranged in the engine compartment.

According to the present invention constructed as described above, the reducing agent spray device is arranged in the engine compartment which is located adjacent the counterweight. It is, therefore, possible to make relatively shorter piping for communicating the reducing agent feeder and the reducing agent spray device to each other and also wiring for connecting the controller and the reducing agent spray device to each other, all of which are included in the assembly arranged in the cavity of the counterweight. Moreover, the laying of the above-mentioned piping and wiring can be performed with ease.

The mounting structure according to the present invention for the NOx reduction device for the construction machine may also be characterized in that in the above-described invention, the reducing agent storage tank is provided with at least one of a residual quantity sensor for sensing a residual quantity of the reducing agent in the reducing agent storage tank and a component detector for detecting a component of the reducing agent in the reducing agent storage tank; and the assembly further comprises piping communicating the reducing agent storage tank and the reducing agent feeder to each other, wiring connecting the reducing agent feeder and the controller to each other, and as appropriate wiring connecting the residual quantity sensor and the controller to each other, and/or wiring connecting the component detector and the controller to each other.

According to the present invention constructed as described above, it is possible to make shorter each of the piping communicating the reducing agent storage tank and the reducing agent feeder to each other, the wiring connecting the reducing agent feeder and the controller to each other, the wiring connecting the residual quantity sensor and the controller to each other, and the wiring connecting the component detector and the controller to each other. Moreover, the laying of the above-mentioned piping and wirings can be performed with ease.

The mounting structure according to the present invention for the NOx reduction device for the construction machine may also be characterized in that in the above-described invention, the construction machine further has a fuel tank for storing therein fuel to be fed to the engine and a hydraulic oil tank for storing therein hydraulic oil to be fed to the hydraulic pump, said fuel tank and hydraulic oil tank being mounted on the body frame, and also has a fuel filter for filtering fuel to be fed to the engine from the fuel tank in which the fuel is stored, an oil filter for filtering the hydraulic oil from the hydraulic pump to the hydraulic actuator, and a lube oil filter for filtering lube oil to be received in the engine, a side wall of the engine compartment, said side wall being located on a side of the hydraulic pump, is provided with an opening and also with a side wall cover capable of opening or closing the opening, and the fuel filter, oil filter and lube oil filter are arranged in the engine compartment at positions in close proximity to the opening, and the assembly is arranged such that the fill opening of the reducing agent storage tank is located in close proximity to the opening.

According to the present invention constructed as described above, upon performing maintenance of the fuel filter, oil filter and lube oil filter or upon filling the reducing agent into the reducing agent storage tank, the maintenance or the filling of the reducing agent can be readily realized through the opening formed in the side wall of the engine compartment by opening the side wall cover. When the construction machine is of a small model, the maintenance work or the filling work of the reducing agent can be performed from the ground on which the construction machine is located.

Advantageous Effects of the Invention

In the present invention, the counterweight is provided with the cavity formed therein, the reducing agent feeder, reducing agent storage tank and controller are integrally arranged as the assembly, and the assembly is to be arranged in the cavity of the counterweight. Therefore, the restrictions on the space for the arrangement of the NOx reduction system can be relaxed compared with before, thereby making it possible to arrange the NOx reduction system even when the construction machine is of a relative small model.

As the reducing agent feeder, reducing agent storage tank and controller are integrated as the assembly and are built compact, the mounting work of the reducing agent feeder, reducing agent storage tank and controller is easy, thereby making it possible to improve the efficiency of the mounting work of the NOx reduction system compared with before.

Owing to the arrangement of the assembly in the cavity formed in the counterweight, the reducing agent feeder, reducing agent storage tank and controller included in the assembly can be protected from external impacts, thereby making it possible to avoid breakage of the reducing agent feeder, reducing agent storage tank and controller by such external impacts.

In addition, the fill opening of the reducing agent storage tank can be positioned in the cavity of the counterweight. Upon filling the reducing agent into the reducing agent storage tank, the effect of wind produced by a fan arranged in the engine compartment can, therefore, be reduced. As a result, the reducing agent can be suppressed from scattering around, and therefore, fouling around the reducing agent storage tank by the reducing agent can be avoided.

Moreover, the arrangement of the NOx reduction system on construction machines of different models such as large and small construction machines can be facilitated, and therefore, the mounting structure has excellent versatility. Described specifically, when a construction machine is of a different model, it is only necessary to set the number of reducing agent storage tank(s) of the unit capacity depending upon the difference in model. Unlike the conventional technologies, it is no longer necessary to arrange a reducing agent storage tank different in capacity depending upon a difference in the model of a construction machine. When the overall diversity of construction machine models is taken into consideration, the present invention can reduce an increase in the number of different components with respect to reducing agent storage tanks, and therefore, can hold the manufacturing cost lower.

BEST MODE FOR CARRYING OUT THE INVENTION

Based on drawings, a description will hereinafter be made of a best mode for carrying out the mounting structure according to the present invention for the NOx reduction system for the construction machine.

Figure 1:
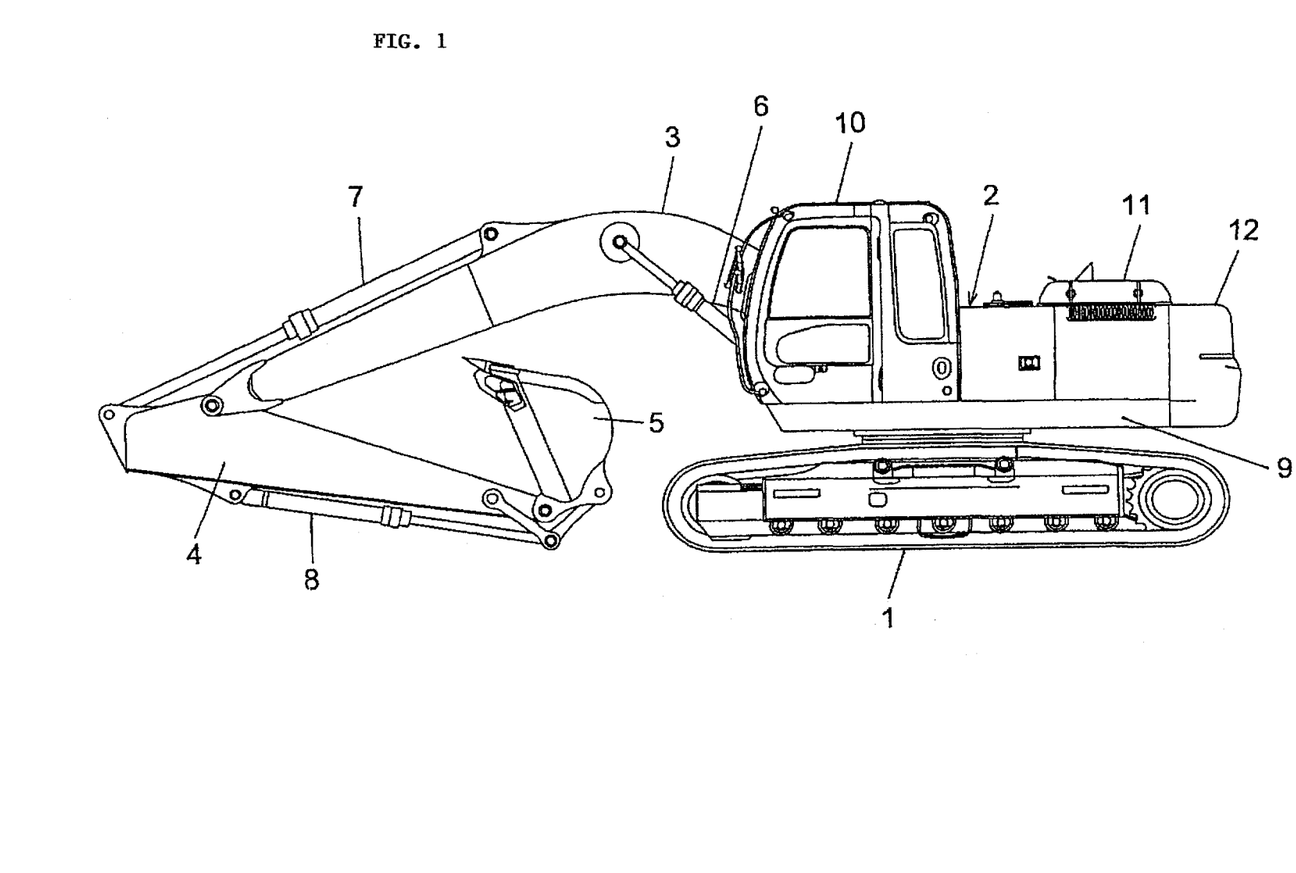
FIG. 1 is a side view of a hydraulic excavator shown as one example of the construction machine to which an embodiment of the mounting structure according to the present invention for the NOx reduction system is applied.
Figure 2:
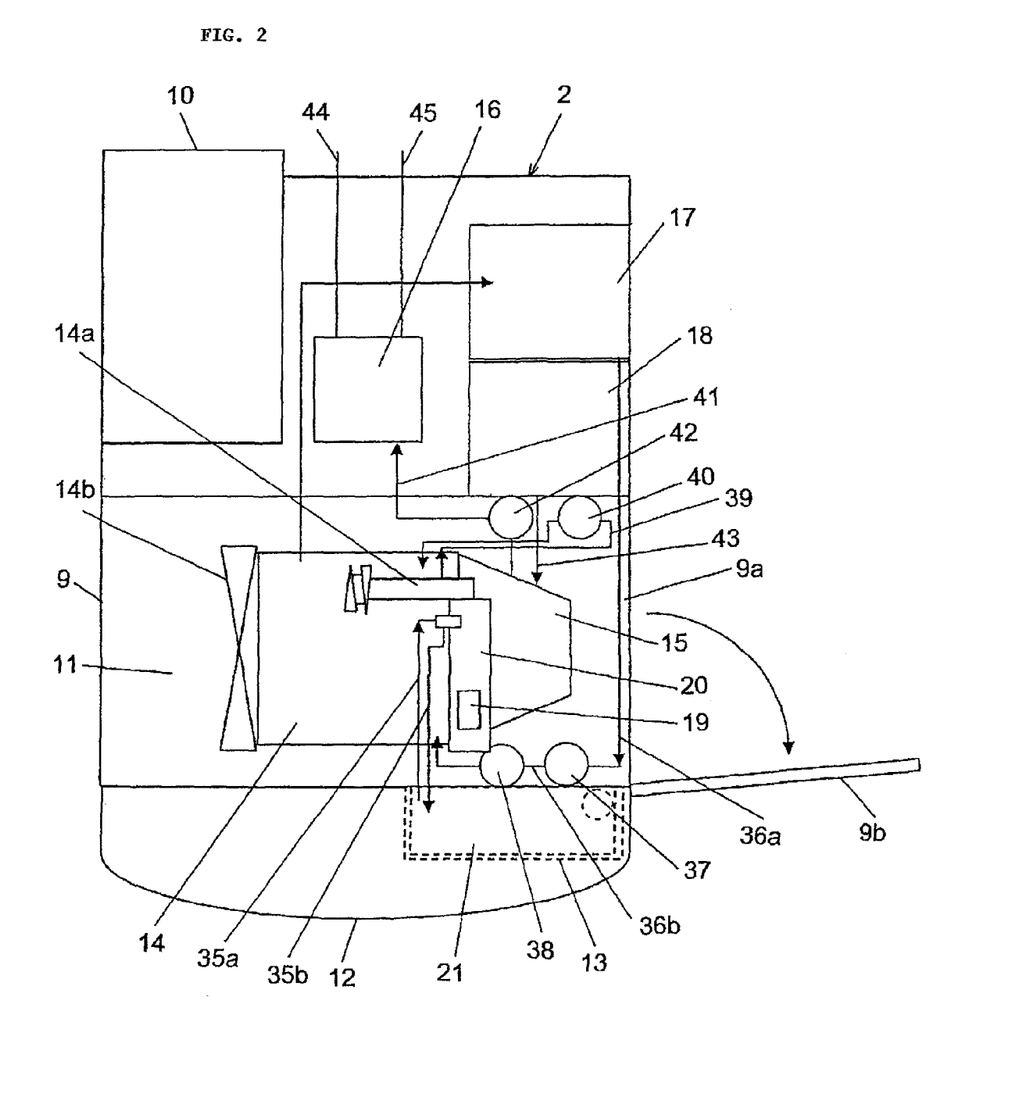
FIG. 2 is a plan view illustrating the embodiment of the mounting structure according to the present invention for the NOx reduction system as arranged on the hydraulic excavator shown in FIG. 1.
Figure 3:
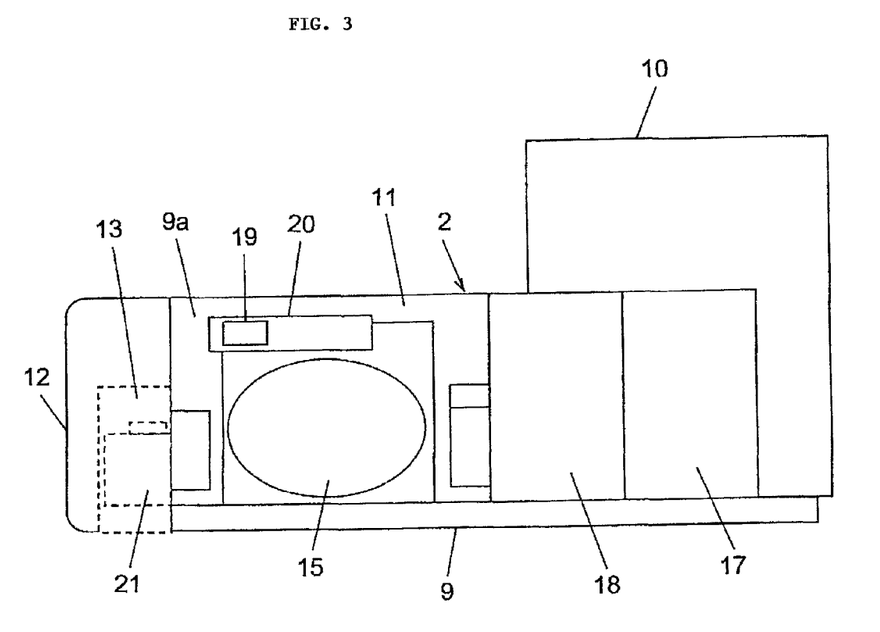
FIG. 3 is a side view of the embodiment illustrated in FIG. 2, with a side cover having been removed.
Figure 4:
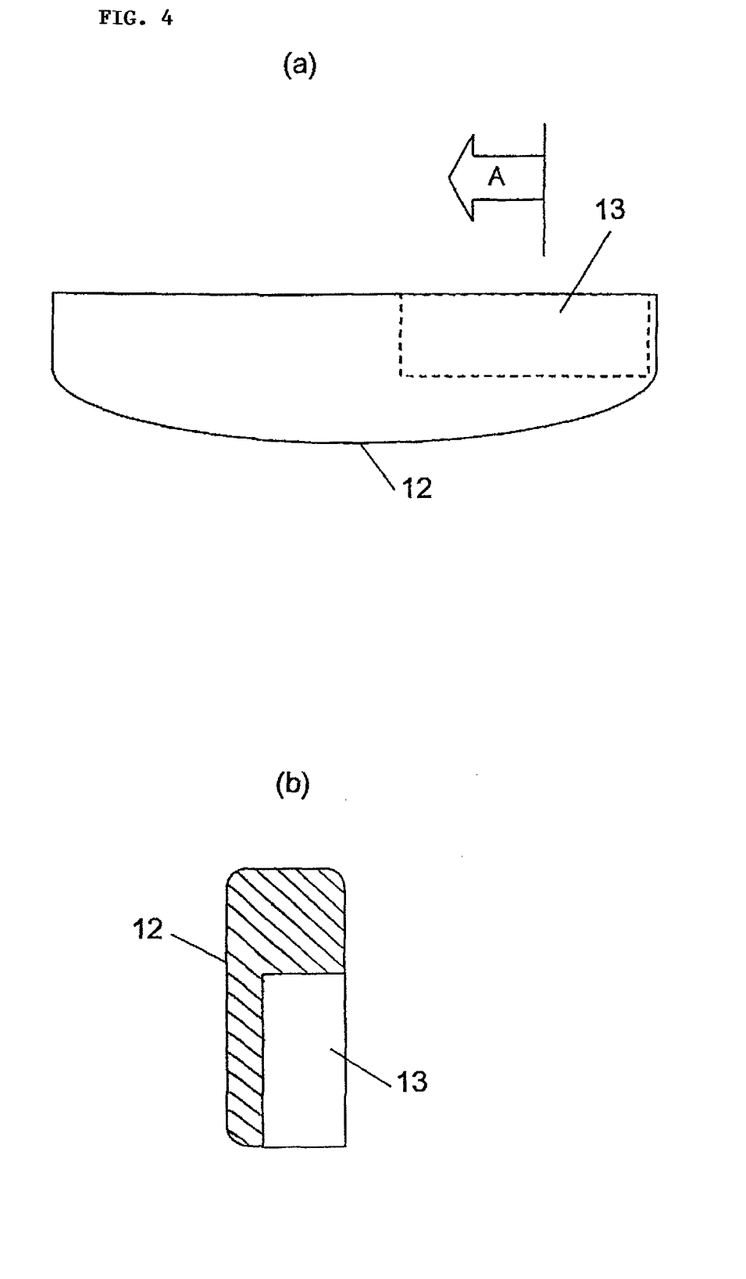
FIG. 4 depicts a counterweight arranged in the hydraulic excavator illustrated in FIG. 1, in which FIG. (a) is a plan view and FIG. (b) is a cross-sectional view taken in a direction of A of FIG. (a).
Figure 5:
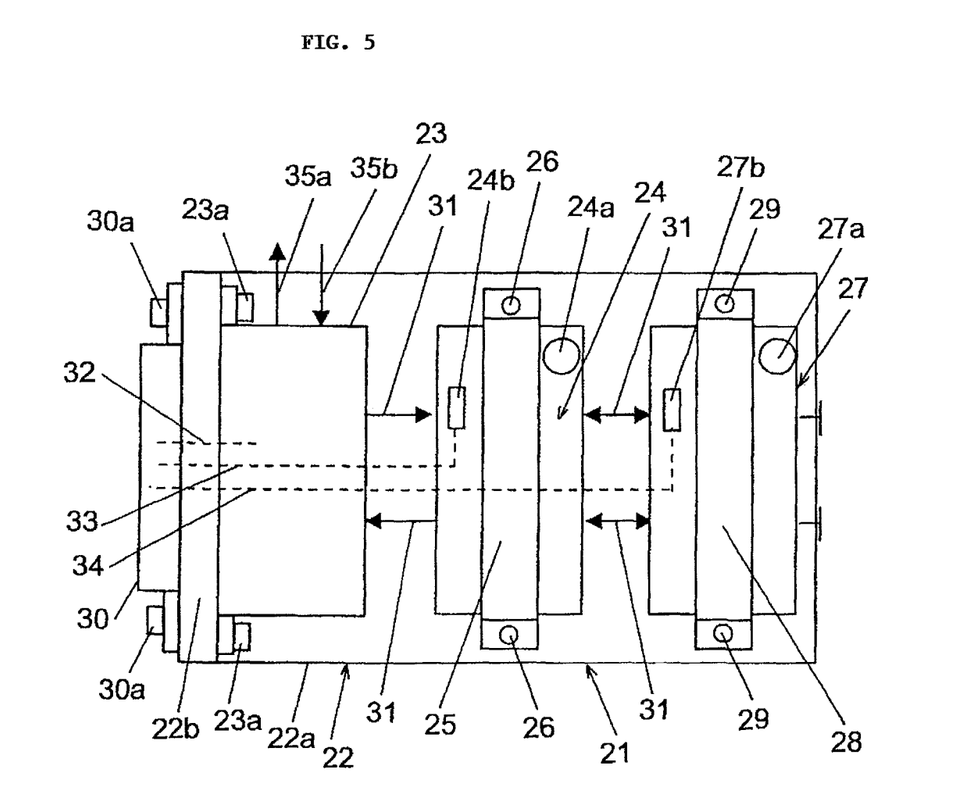
FIG. 5 is a plan view showing an assembly arranged in this embodiment.
Figure 6:
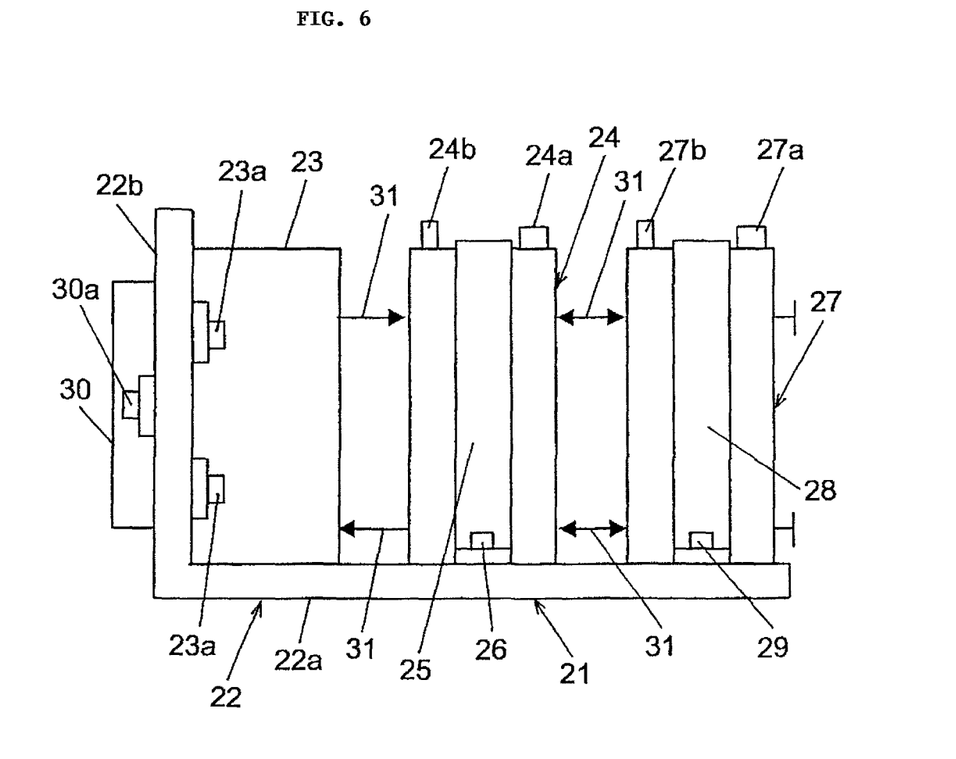
FIG. 6 is a side view of the assembly shown in FIG. 5.
Figure 7:
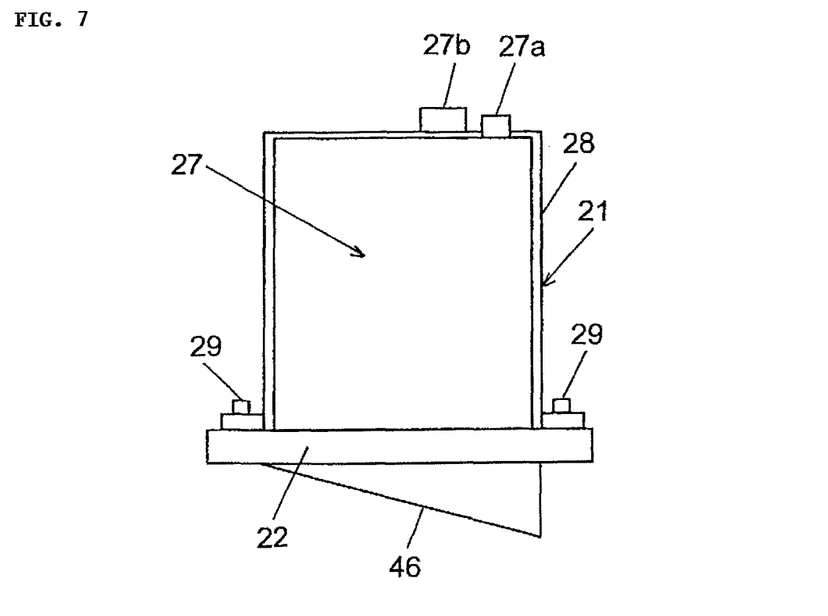
FIG. 7 illustrates the mounting of the assembly, which is shown in FIG. 5, on a body frame.

FIG. 1 is a side view of a hydraulic excavator shown as one example of the construction machine to which an embodiment of the mounting structure according to the present invention for the NOx reduction system is applied, FIG. 2 is a plan view illustrating the embodiment of the mounting structure according to the present invention for the NOx reduction system as arranged on the hydraulic excavator shown in FIG. 1, and FIG. 3 is a side view of the embodiment illustrated in FIG. 2, with a side cover having been removed. FIG. 4 depicts a counterweight arranged in the hydraulic excavator illustrated in FIG. 1, in which FIG. (a) is a plan view and FIG. (b) is a cross-sectional view taken in a direction of A of FIG. (a). FIG. 5 is a plan view showing an assembly arranged in this embodiment, FIG. 6 is a side view of the assembly shown in FIG. 5, and FIG. 7 illustrates the mounting of the assembly, which is shown in FIG. 5, on a body frame.

The construction machine to which the mounting structure of this embodiment for the NOx reduction system can be applied is, for example, the hydraulic excavator shown in FIG. 1, and this hydraulic excavator is equipped with a travel base 1 and a revolving upperstructure 2 mounted on the travel base 1. The hydraulic excavator is also provided with a boom 3 pivotally attached in an up-and-down direction to the revolving upperstructure 2, an arm 4 pivotally attached in an up-and-down direction to a forward end of the boom 3, and a bucket 5 pivotally attached to a forward end of the arm 4 such that it can be used in digging work or the like. These boom 3, arm 4 and bucket 5 make up a front working mechanism.

Also provided are a boom cylinder 6 for driving the boom 3, an arm cylinder 7 for driving the arm 4 and a bucket cylinder 8 for driving the bucket 5, and in addition, an unillustrated travel motor for causing the travel base 1 to travel, an unillustrated swing motor for causing the revolving upperstructure 2 to swing, and the like. A hydraulic actuator is comprised of the boom cylinder 6, arm cylinder 7 and bucket cylinder 8, the unillustrated travel motor and swing motor, and the like.

On a body frame 9 arranged in the revolving upperstructure 2, an operator's cab 10 is arranged at a front-side position, and a counterweight 12 for securing a weight balance to maintain stability of the machine is arranged at a rear-side position. On a front-side part located adjacent the counterweight 12, an engine compartment 11 is arranged.

As shown in FIG. 2, arranged in the engine compartment 11 are an engine 14 equipped with a turbocharger 14a, a fan 14b drivable by the engine 14 to produce wind that cools engine coolant or the like flowing through an unillustrated heat exchanger, and a hydraulic pump 15 drivable by the engine 14 to feed pressure oil to the above-mentioned hydraulic actuator. At a position outside the engine compartment 11 and in a vicinity of the operator's cab 10, a hydraulic pressure control valve unit 16 is arranged to control a flow of pressure oil to be fed from the hydraulic pump 15 to the above-mentioned hydraulic actuator.

Arranged at a position in close proximity to the hydraulic pressure control valve unit 16 located outside the engine compartment 11 are a fuel tank 17 for storing fuel to be fed to the engine 14 and a hydraulic oil tank 18 for storing hydraulic oil to be drawn into the hydraulic pump 15 via piping 43.

As illustrated in FIG. 2, piping 36a is connected to the fuel tank 17, and via piping 36b, the piping 36a and an unillustrated fuel injection device for the engine 1 are connected to each other. Arranged in this piping 36b are a fuel prefilter 37 and a fuel main filter 38. The fuel prefilter 37 filters fuel to be guided from the fuel tank 17 to the fuel injection device such that foreign matter in the fuel is eliminated, and the fuel main filter 38 further filters the fuel which has been filtered by the fuel prefilter 37. Piping 39 is also arranged to guide lube oil to the engine 1, and in this piping 39, a lube oil filter 40 is arranged to filter the lube oil such that foreign matter in the lube oil is eliminated. In addition, piping 41 is arranged to guide pressure oil, which has been delivered from the hydraulic pump 15, to the hydraulic pressure control valve unit 16. In the piping 41, an oil filter 42 is arranged to filter the pressure oil, which is to be fed to the hydraulic actuator, such that foreign matter in the pressure oil is eliminated. The hydraulic pressure control valve unit 16 and the hydraulic actuator are connected to each other by a feed piping 44 and a return piping 45. The feed piping 44 feeds the pressure oil from the hydraulic pump 15 to the hydraulic actuator, while the return piping 45 returns to the tank the pressure oil discharged from the hydraulic actuator.

The above-mentioned fuel prefilter 37, fuel main filter 38, lube oil filter 40 and oil filter 42 are arranged, for example, at positions in close proximity to the hydraulic pump 15.

Further, the above-mentioned counterweight 12 is provided with a cavity 13 formed therein as depicted in FIG. 4.

The NOx reduction system, which is arranged by the mounting structure according to this embodiment on the hydraulic excavator having such construction as described above, includes a reduction catalyst arranged in the exhaust passage of the engine 14 to reduce and purify nitrogen oxides (NOx) emitted from the engine 14, for example, a urea SCR catalyst 19 and a reducing agent spray device for spraying urea water into the exhaust passage of the engine 14, for example, a urea water spray device 20. The urea SCR catalyst 19 and urea water spray device 20 are arranged, for example, in the engine compartment 11.

As shown in FIGS. 5 and 6, the NOx reduction system arranged by the mounting structure according to this embodiment also includes a reducing agent feeder for feeding the urea water to the urea water spray device 20, specifically a urea water feeder 23, a reducing agent storage tank for storing the urea water to be guided to the urea water feeder 23, specifically a first urea-water tank 24 having a fill opening 24a for filling the urea water, a reducing agent storage tank for storing the urea water to be guided to the urea water feeder 23 via the first urea-water tank 24, specifically a second urea-water tank 27 having a fill opening 27a for filling the urea water.

The first urea-water tank 24 and second urea-water tank 27 are constructed identical in shape and capacity. Specifically, they are each constructed to have a unit capacity. The first urea-water tank 24 is provided with a residual quantity sensor 24b for detecting a residual amount of the urea water in the first urea-water tank 24, and the second urea-water tank 27 is equipped with a component detector 27b for detecting a component of the urea water in the second urea-water tank 27. The urea water feeder 23 and the first urea-water tank 24 are communicated to each other by piping 31 through which the urea water is guided, and are the first urea-water tank 24 and the second urea-water tank 27.

The NOx reduction system arranged by the mounting structure according to this embodiment also includes a controller 30 for controlling drive of each of the above-mentioned urea water spray device 20 and urea water feeder 23. The urea water feeder 23 and the controller 30 are connected to each other by wiring 32 shown in FIG. 5. Further, the above-mentioned residual quantity detector 24b and the controller 30 are connected to each other by wiring 33, and the above-mentioned component detector 27b and the controller 30 are connected to each other by wiring 34.

The NOx reduction system arranged by the mounting structure according to this embodiment is provided, as shown in FIGS. 5 and 6, with an assembly 21, in which the urea water feeder 23, first urea-water tank 24, second urea-urea tank 27 and the controller 30 are integrally arranged including the above-mentioned piping 31 and the wirings 32, 33, 34, and this assembly 21 is arranged in the above-mentioned cavity 13 of the counterweight 12.

As shown in FIGS. 5 and 6, the assembly 21 is provided with a bracket 22, which has a bottom wall part 22a and an upright part 22b formed upright on an edge portion of the bottom wall part 22a and is fixedly secured on the body frame 9. The urea water feeder 23 is fixedly secured by bolts 23a on the upright part 22b of the bracket 22. The first urea-water tank 24 is fastened down by a fastening band 25 fixedly secured by bolts 26 on the bottom wall part 22a of the bracket 22. Similarly, the second urea-water tank 27 is fastened down by a fastening band 28 fixedly secured by bolts 29 on the bottom wall part 22a of the bracket 22. The controller 30 is fixedly secured by bolts 30a on a side of the upright part 22b of the bracket 22, said side being opposite to a side on which the urea-water feeder 23 is secured.

The bracket 22 of the assembly 21, said bracket 22 having been constructed as described above, is secured on the body frame 9, for example, via a securing bracket 46 illustrated in FIG. 7. Described specifically, the securing bracket 46 is fixedly secured on a back side of the bottom plate part 22a of the bracket 22 and the securing bracket 46 is fixedly secured on the body frame 9, for example, by bolts, whereby the assembly 21 is mounted on the body frame 9.

In the hydraulic excavator on which the NOx reduction system is arranged by the mounting structure according to the present invention, an opening 9a is arranged in a side wall of the engine compartment 11, said side wall being located on a side of the hydraulic pump 15, and further, a side wall cover 9b capable of opening or closing the opening 9a is arranged. The above-mentioned fuel prefilter 37, fuel main filter 38, lube oil filter 40 and oil filter 42 are arranged at positions in close proximity to the opening 9a of the engine compartment 11. The assembly 21 is arranged such that the fill opening 24a of the first urea-water tank 24 and the fill opening 27a of the second urea-water tank 27 are located in close proximity to the opening 9a. Therefore, the above-mentioned cavity 13 of the counterweight 12, in which the assembly 21 is arranged, has been formed beforehand such that the assembly 21 can be positioned close to the side wall of the engine compartment 22, said side wall being located on the side where the hydraulic pump 15 is arranged.

In the NOx reduction system constructed as described above and arranged by the mounting structure according to this embodiment, the urea water stored in the first urea-water tank 24 and second urea-water tank 27 is guided to the urea water feeder 23 via the pipings 31, and from the urea water feeder 23, the urea water is fed to the urea water spray device 20 via piping 35a illustrated in FIGS. 2 and 5. Any surplus urea water remaining unsprayed at the urea water spray device 20 is returned to the urea water feeder 23 via piping 35b. NOx-containing exhaust gas discharged into the exhaust passage of the engine 14 is reduced and purified by the urea water sprayed from the urea water spray device 20 into the exhaust passage and the urea SCR catalyst 19, and as exhaust gas reduced in NOx, is released into the atmosphere.

According to the NOx reduction system constructed as described above and arranged by the mounting structure of this embodiment, the urea water feeder 23, first urea-water tank 24, second urea-water tank 27 and controller 30 among the components, which make up the NOx reduction system, are integrated as the assembly 21, and this assembly 21 is arranged in the cavity 13 of the counterweight 12. Therefore, the urea SCR catalyst 19 and urea water spray device 20, the remaining components of the NOx reduction system, can be arranged at positions outside the counterweight 12, for example, in the engine compartment 11, thereby making it possible to relax the restrictions on the space for the arrangement of the NOx reduction system. The NOx reduction system can hence be arranged by the mounting structure according to this embodiment even when the hydraulic excavator on which the NOx reduction system is arranged is of a relatively small model and is prone to restrictions on the space for its arrangement.

As the urea water feeder 23, first urea-water tank 24, second urea-water tank 27 and controller 30 are integrated compact as the assembly 21 by means of the bracket 22, the installation of the urea water feeder 23, first urea-water tank 24, second urea-water tank 27 and controller 30 is easy, and therefore, this installation can be performed with improved efficiency.

The urea water feeder 23, first urea-water tank 24, second urea-water tank 27, controller 30, piping 31 and wirings 32,33,34, which are included in the assembly 21, are each protected by the counterweight 21 composed of the solid body. Accordingly, the urea water feeder 23, first urea-water tank 24, second urea-water tank 27, controller 30, the piping 31 and wirings 32,33,34 can be protected from external impacts, thereby making it possible to avoid breakage of each of the urea water feeder 23, first urea-water tank 24, second urea-water tank 27, controller 30, piping 31 and wirings 32,33,34 by such external impacts.

As the fill opening 24a of the first urea-water tank 24 and the fill opening 27a of the second urea-water tank 27 can be positioned in the cavity 13 of the counterweight 12, the effect of wind produced by the fan 14b arranged in the engine compartment 11 can be reduced upon filling the urea water into the first urea-water tank 24 and second urea-water tank 27. As a result, it is possible to suppress the urea water from scattering around, and hence, to avoid fouling around the first urea-water tank 24 and second urea-water tank 27 in the engine compartment 11.

Figure 8:
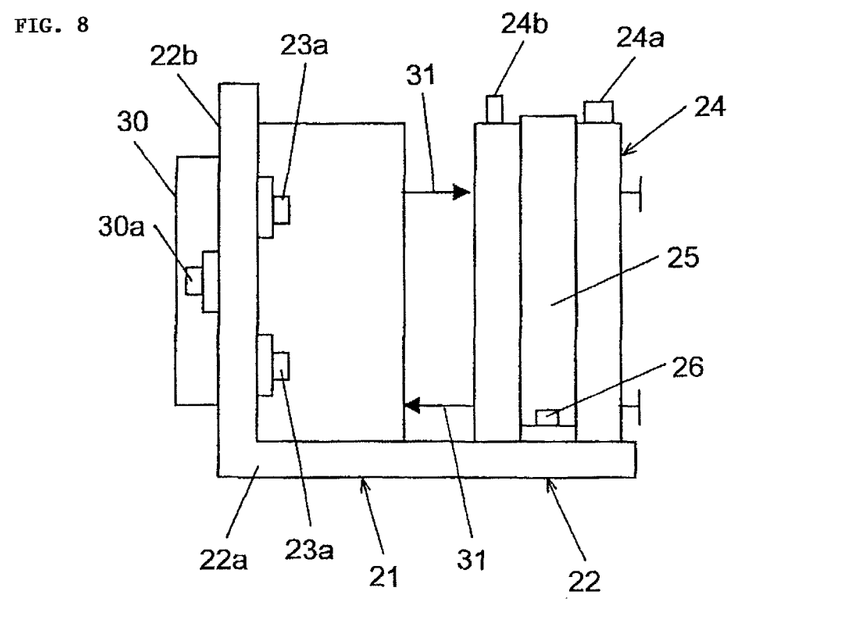
FIG. 8 is a side view depicting essential parts of another embodiment of the mounting structure according to the present invention for the NOx reduction system for a construction machine.

Further, the mounting structure according to this embodiment can facilitate the arrangement of the NOx reduction system on construction machines of different models such as large and small models, like unillustrated hydraulic excavators of models different in size from the excavator illustrated in FIG. 1, and therefore, has excellent versatility. Described specifically, upon arranging the NOx reduction system by the mounting structure according to this embodiment, for example, on a construction machine of a small model, it is sufficient to arrange, as a urea water storage tank to be included in the assembly 21, only the first urea-water tank 24 of the unit capacity as depicted in FIG. 8. Upon arranging it on a construction machine of a large model, on the other hand, it is only necessary to arrange a plurality of urea water storage tanks of the unit capacity such as the first urea-water tank 24 and second urea-water tank 27 as indicated in the above-mentioned embodiment. It is, therefore, unnecessary to individually manufacture a urea water storage tank of a different capacity depending on a difference in the model of each construction machine. When the overall diversity of construction machine models is taken into consideration, the present invention can reduce the number of different components with respect to urea water storage tanks, and therefore, can reduce the manufacturing cost.

As the urea water spray device 20 is arranged in the engine compartment 11 located adjacent the counterweight 12, it is possible to make relatively short the pipings 35a, 35b, which communicate the urea water feeder 23 included in the assembly 21 arranged in the cavity 13 of the counterweight 12 to the urea water spray device 20, and an unillustrated wiring connecting the controller 30 and the urea water spray device 20 to each other, thereby making it possible to reduce the manufacturing cost. The laying of the above-mentioned pipings 35a, 35b and unillustrated wiring can also be facilitated, so that the efficiency of the connection work of these pipings 35a,35b and unillustrated wiring can be improved.

In addition, the piping 31 connecting the first urea-water tank 24 and the urea water feeder 23 to each other, the piping 31 connecting the first urea-water tank 24 and the second urea-water tank 27 to each other, the wiring 32 connecting the urea water feeder 23 and the controller 30 to each other, the wiring 33 connecting the residual quantity sensor 24b and the controller 30 to each other and the wiring 34 connecting the component detector 27b and the controller 30 to each other are all included in the assembly 21. Therefore, the piping 31 and wiring 32, 33, 34 can be made shorter, and the manufacturing cost can be reduced. Further, the laying of the piping 31 and wiring 32, 33, 34 can be facilitated, so that the efficiency of the connection work of the piping 31 and wiring 32, 33, 34 can be improved.

Furthermore, the side wall cover 9b capable of opening or closing the opening 9a of the engine compartment 11 is arranged, the fuel prefilter 37, fuel main filter 38, oil filter 42 and lube oil filter 40 are arranged at the positions in close proximity to the opening 9a of the engine compartment 11, and the assembly 21 is arranged in the cavity 13 of the counterweight 12 such that the fill opening 24a of the first urea-water tank 24 and the fill opening 27a of the second urea-water tank 27 are located in close proximity to the opening 9a. Upon performing maintenance of the fuel prefilter 37, fuel main filter 38, oil filter 42 and lube oil filter 40 or upon filling the urea water into the first urea-water storage tank 24 and second urea-water storage tank 27, the maintenance or the filling of the urea water can be readily realized through the opening 9a in the side wall of the engine compartment 11 by opening the side wall cover 9b. The efficiency of the maintenance work and filling work of the urea water can hence be improved. When the construction machine is of a small model, the maintenance work and the filling work of the urea water can be performed from the ground on which the construction machine is located, and the efficiency of the maintenance work and filling work of the urea water can hence be improved further.

Legend
2 Revolving upperstructure
6 Boom cylinder (hydraulic actuator)
7 Arm cylinder (hydraulic actuator)
8 Bucket cylinder (hydraulic actuator)
9 Body frame
9a Opening
9b Side wall cover
11 Engine compartment
12 Counterweight
13 Cavity
14 Engine
14b Turbocharger
15 Hydraulic pump
16 Hydraulic pressure control valve unit
17 Fuel tank
18 Hydraulic oil tank
19 Urea SCR catalyst
20 Urea water spray device (reducing agent spray device)
21 Assembly
22 Bracket
23 Urea water feeder (reducing agent feeder)
24 First urea-water tank (reducing agent storage tank)
24a Fill opening
24b Residual quantity sensor
27 Second urea-water tank (reducing agent storage tank)
27a Fill opening
27b Component detector
30 Controller
31 Piping
32 Wiring
33 Wiring
34 Wiring
35a Piping
35b Piping
36a Piping
36b Piping
37 Fuel prefilter
38 Fuel main filter
39 Piping
40 Lube oil filter
41 Piping
42 Oil filter
43 Piping
46 Securing bracket

The invention claimed is:

1. A mounting structure for an NOx reduction system from a construction machine, comprising:
the construction machine, said construction machine having an engine, a hydraulic pump drivable by the engine, a hydraulic actuator drivable by pressure oil delivered from the hydraulic pump, a hydraulic pressure control valve unit for controlling a flow of pressure oil to be fed from the hydraulic pump to the hydraulic actuator, a body frame holding the engine, the hydraulic pump and the hydraulic pressure control valve unit in place thereon, and a counterweight fixedly secured on the body frame at a rear position of a body to maintain stability of the body, and
the NOx reduction system, said NOx reduction system including a reduction catalyst to be arranged in an exhaust passage of the engine to reduce and purify nitrogen oxides emitted from the engine, a reducing agent spray device or spraying a reducing agent into the exhaust passage of the engine, a reducing agent feeder for feeding the reducing agent to the reducing agent spray device, a reducing agent storage tank having a fill opening to fill the reducing agent and to store therein the reducing agent to be guided to the reducing agent feeder, and a controller for controlling drive of the reducing agent spray device and reducing agent feeder, and said NOx reduction system mounted on the body frame, wherein:
the reducing agent feeder, reducing agent storage tank and controller are integrally arranged as an assembly,
the counterweight is provided with a cavity formed therein, the cavity being formed beforehand such that the assembly can be positioned close to a sidewall of an engine compartment, said side wall being located on a side where the hydraulic pump is arranged, and
said assembly is to be arranged in said cavity of the counterweight, being fixedly secured on a bracket of the body frame.

2. The mounting structure according to claim 1, wherein:
the construction machine is provided adjacent the counterweight with an engine compartment in which the engine and hydraulic pump are arranged, and the reduction catalyst and reduction catalyst spray device are arranged in the engine compartment.

3. The mounting structure according to claim 2, wherein:
the reducing agent storage tank is provided with at least one of a residual quantity sensor for sensing a residual quantity of the reducing agent in the reducing agent storage tank and a component detector for detecting a component of the reducing agent in the reducing agent storage tank; and the assembly further comprises piping communicating the reducing agent storage tank and the reducing agent feeder to each other, wiring connecting the reducing agent feeder and the controller to each other, and at least one of wiring connecting the residual quantity sensor and the controller to each other and wiring connecting the component detector and the controller to each other.

4. The mounting structure according to claim 3, wherein:
the construction machine further has a fuel tank for storing therein fuel to be fed to the engine and a hydraulic oil tank for storing therein hydraulic oil to be fed to the hydraulic pump, said fuel tank and hydraulic oil tank being mounted on the body frame, and also has a fuel filter for filtering fuel to be fed to the engine from the fuel tank in which the fuel is stored, an oil filter for filtering the hydraulic oil from the hydraulic pump to the hydraulic actuator, and a lube oil filter for filtering lube oil to be received in the engine,
a side wall of the engine compartment, said side wall being located on a side of the hydraulic pump, is provided with an opening and also with a side wall cover capable of opening or closing the opening, and
the fuel filter, oil filter and lube oil filter are arranged in the engine compartment at positions in close proximity to the opening, and the assembly is arranged such that the fill opening of the reducing agent storage tank is located in close proximity to the opening.

* * * * *